(12) United States Patent
Au et al.

(10) Patent No.: US 12,064,869 B2
(45) Date of Patent: Aug. 20, 2024

(54) MORPHABLE INERTIAL APPEMDAGE, SYSTEMS AND ASSOCIATED METHODS

(71) Applicant: The Chinese University of Hong Kong, Hong Kong (CN)

(72) Inventors: Kwok Wai Samuel Au, Hong Kong (CN); Jiajun An, Hubei (CN); Xiangyu Chu, Hunan Province (CN); Tsz Yin Chung, Hong Kong (CN); Chun Ho Lo, Hong Kong (CN); Hoi Wut Yip, Hong Kong (CN); Carlos Ma, Hong Kong (CN)

(73) Assignee: The Chinese University of Hong Kong, Hong Kong SAR (CN)

( * ) Notice: Subject to any disclaimer, the term of this patent is extended or adjusted under 35 U.S.C. 154(b) by 946 days.

(21) Appl. No.: 16/801,005

(22) Filed: Feb. 25, 2020

(65) Prior Publication Data
US 2020/0298425 A1 Sep. 24, 2020

Related U.S. Application Data

(60) Provisional application No. 62/810,258, filed on Feb. 25, 2019.

(51) Int. Cl.
*B25J 18/02* (2006.01)
*B25J 18/04* (2006.01)

(52) U.S. Cl.
CPC ............. *B25J 18/025* (2013.01); *B25J 18/04* (2013.01)

(58) Field of Classification Search
CPC ........ B25J 18/025; B25J 18/04; B25J 9/0027; B25J 3/00; B25J 5/00
See application file for complete search history.

(56) References Cited

U.S. PATENT DOCUMENTS

| | | | | |
|---|---|---|---|---|
| 5,322,334 A | * | 6/1994 | Hammer | B25G 1/04 15/144.4 |
| 9,308,652 B2 | * | 4/2016 | Pehlivan | B25J 18/025 |
| 2020/0338758 A1 | * | 10/2020 | Schultz | B25J 9/003 |

FOREIGN PATENT DOCUMENTS

CN 107433618 B * 11/2019 ............ B25J 18/025

* cited by examiner

*Primary Examiner* — Zakaria Elahmadi
(74) *Attorney, Agent, or Firm* — Kilpatrick Townsend & Stockton LLP

(57) ABSTRACT

Devices, systems and methods of controlling movement of a host mechanical system using inertial forces imparted by an augmentable or morphable appendage. Such appendages are attached to the host mechanical system such that augmentation or morphing of the appendage to move a mass of the appendage from an extended to a retracted configuration imparts inertial forces to the supporting structure. Augmentation/morphing is controlled and coordinated such that imparted inertial forces facilitate a desired movement of the mechanical system. The imparted forces can include translation forces and/or rotational forces along one or more axes. The augmentation or morphing of the appendage can be performed concurrently with separately controlled coordinated movement of the appendage to facilitate a desired movement of the mechanical system. Such appendages can include, but are not limited to, telescoping and/or folding designs.

17 Claims, 16 Drawing Sheets

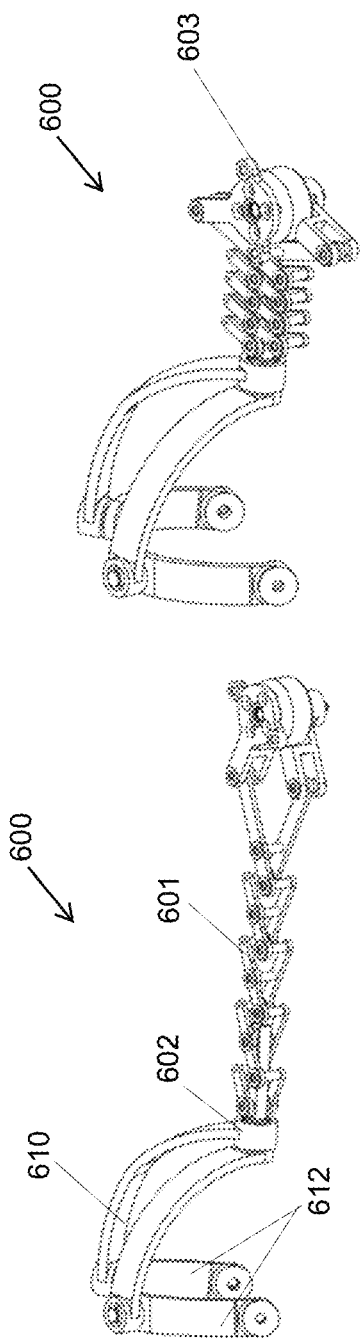
FIG. 6A
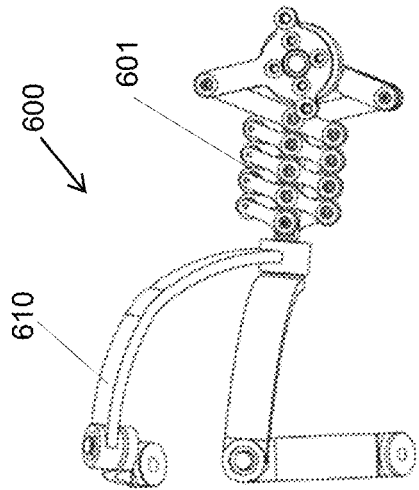
FIG. 6B
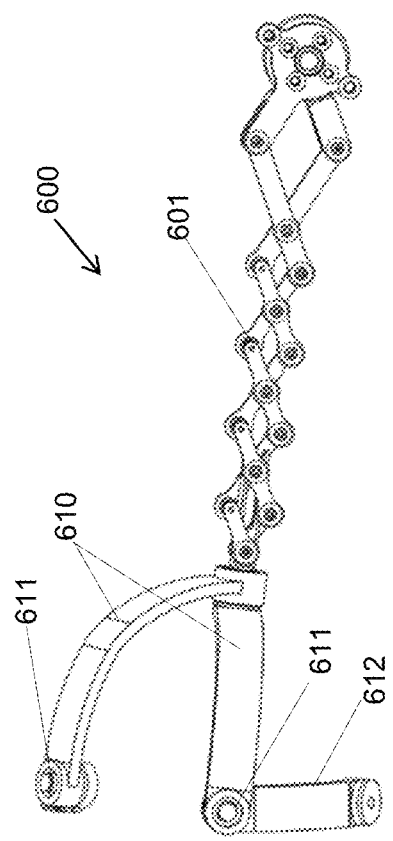
FIG. 6C
FIG. 6D

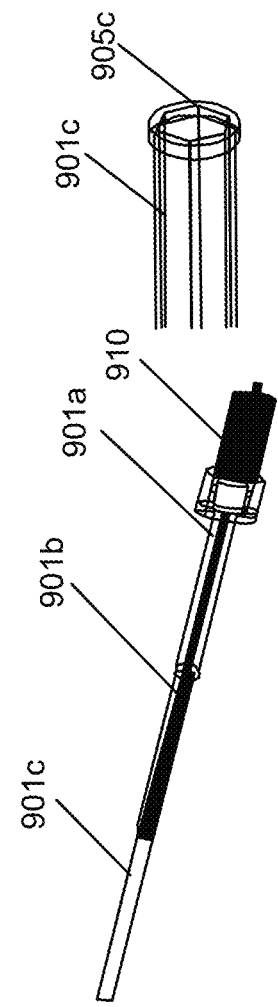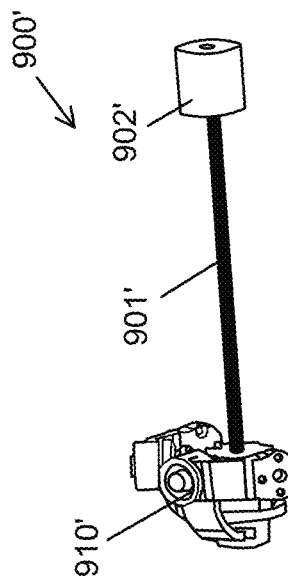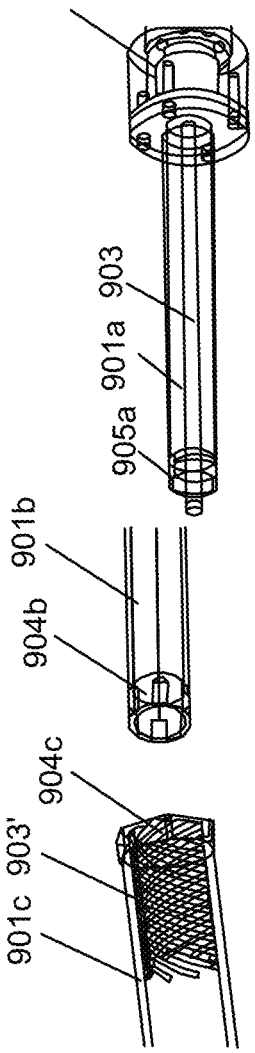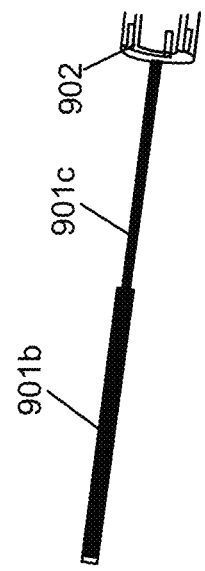

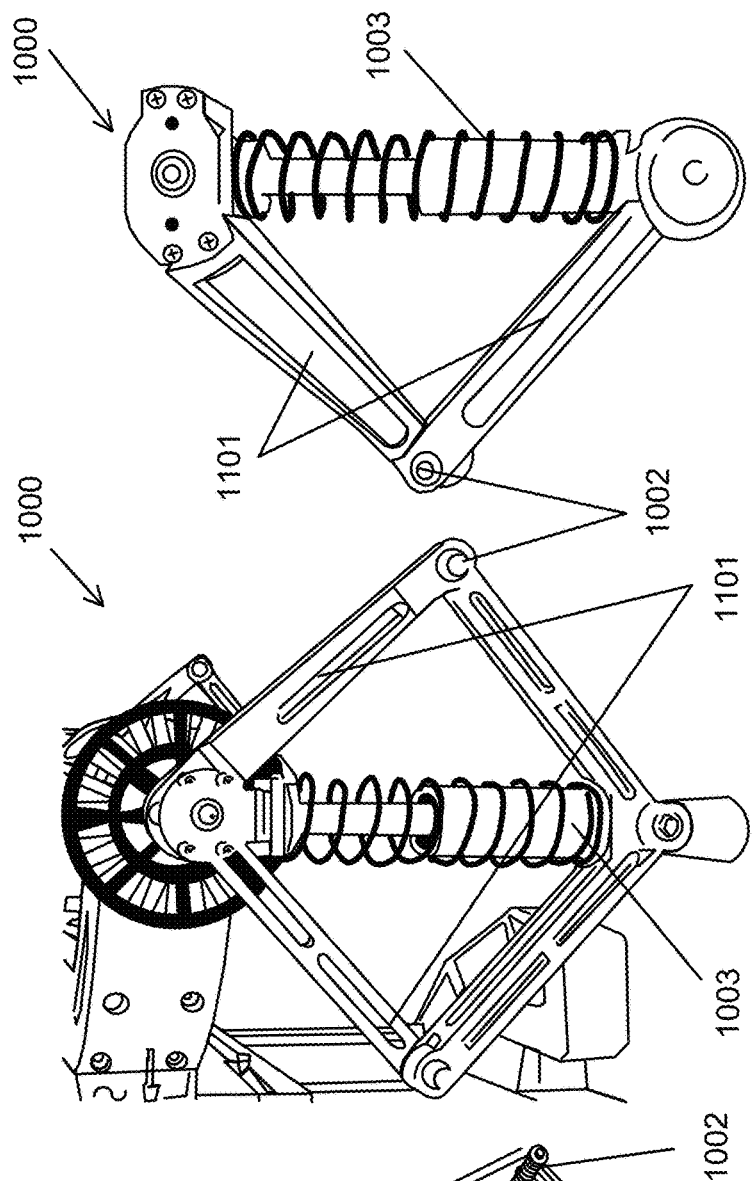
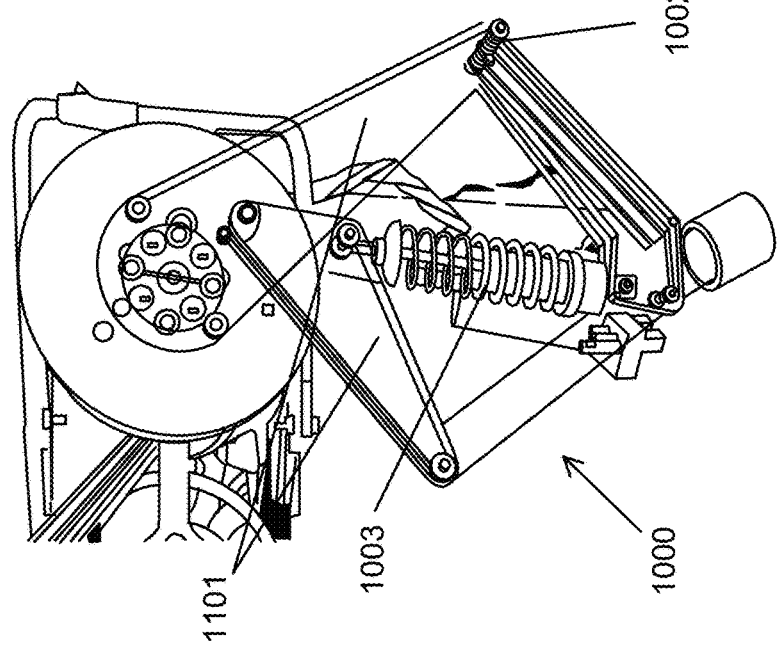
FIG 10C
FIG 10B
FIG 10A

MORPHABLE INERTIAL APPEMDAGE, SYSTEMS AND ASSOCIATED METHODS

CROSS-REFERENCES TO RELATED APPLICATIONS

This application is a Non-Provisional of and claims the benefit of priority of U.S. Provisional Application No. 62/810,258 filed Feb. 25, 2019, the entire contents of which are incorporated herein by reference.

FIELD OF THE INVENTION

The invention pertains to mechanical and robotic systems, in particular locomotion mechanical systems that enable movements from one place to another, both in the three-dimensional space and in the sense of rotations.

BACKGROUND OF THE INVENTION

Traditionally, these types of movement required installation and use of actuators and structures with predefined mechanical and dynamic properties. In turn, these structures become redundant masses that adversely affect system performances when the hosts are not engaging in rapid manoeuvres.

While previous technologies have been developed to provide improved movement by using transferred forces/moments without ground contact, there currently exist no parallel appendage mechanisms utilizing augmentable or morphable inertial appendage to improve movement, particularly locomotion. Conventional technologies that sought to provide such improved movement include a serial link tail system and an angled haptic feedback system.

In regard to serial link tail systems, such as that described by Rone and Tzvi (2018), each motor must support the motors and structure downstream of its position, creating rotations that are suboptimal with changing centers of rotations. The weight and length of the end tail mass is also fixed, rendering its mechanical properties largely unchangeable.

In regard to angled haptic feedback devices, these devices utilize a remote center actuation system; however, they were typically designed for force-feedback and unable to perform in locomotion torque generation tasks. Such designs also typically require three or more motors for operation.

In another approach, use of a 3-axes reaction wheel (often used in satellite applications) can supply rotation torques to its host, however, the wheel must spin at considerably high speeds in order to achieve sufficiently high impulsive torques. Generally, such designs are only suitable for slow response applications such as satellite re-orientation. Yet, in dynamic locomotion applications, mechanical and robotic systems are often required to respond in only a fraction of a second for balancing and maneuverability.

In yet another approach, use of a control moment gyroscope (often used in satellite applications) can supply a considerably larger amount of rotation torques to its host in a timely manner through rotating the axes of a single or multiples of spinning flywheels. However, the control moment gyroscope is mechanically more complex, and particularly, requires a sizeable amount of volume in the system body so that it can rotate continuously without colliding with other parts of the body or the ground.

Therefore, there exists a need for an approach that facilitates improved movement of a mechanical system while avoiding the drawbacks associated with conventional technologies described above. It would be further advantageous for an approach that could be readily applied to existing technologies systems.

BRIEF SUMMARY

In one aspect, the present invention pertains to a morphable inertial appendage that is attachable to a host mechanical system and that imparts inertial forces to the host in a timely manner to provide improved movement, while avoiding the drawbacks discussed above.

In some embodiments, the morphable inertial appendage system includes a morphable appendage that is morphable between an extended configuration and a retracted configuration by use of a morphing actuation system. The system can further include an additional actuator system operably coupled to the appendage that is configured to control movement of the appendage along one or more degrees of freedom. Typically, the morphable appendage comprises a distal mass disposed at or near the distal end of the appendage, the distal mass having a sufficient mass to impart a desired inertial force upon movement of the appendage (e.g. 100 g or greater depending on the forces desired). In some embodiments, the system utilizes a conjuncture of a morphable inertial appendage that enables variation of moments of inertia during operation, a parallel spherical five-bar manipulator that allows two motors to drive a payload (the morphable inertial appendage) at the same time for high-performance movements, and a software package that is robust and adaptive against variations in appendage and host operational states.

In some embodiments, the morphable inertial appendage system includes: a parallel motor actuator system, a tail retraction/extension actuator system, a spherical five-bar manipulator, and the morphable inertial appendage. In one aspect, utilizing motors in parallel (e.g. two motors or motor systems) provides smooth rotations at high torques. Since the motors operate in parallel, both motors contribute to the rotation of all three axes about the same rotational center. The appendage retraction/extension actuator system can be realized by any of: electric motors, electric servos, fuel engines, electromagnetic pistons, hydraulic pistons, gas pistons, pulley systems, or any combination thereof. The retraction/extension actuator system can be disposed on the host or on the appendage. In some embodiments, the morphable inertial appendage is designed with a telescopic mechanism that is actuatable by any of: cables and springs, lead-screw/ball-screw sliders, electromagnetic voice-coil(s) or any combination thereof. In other embodiments, the appendage is designed as a multi-bar-linkage folding mechanism. In some embodiments, the moments of inertia of the appendage can be readily changed by the telescopic or folding operations of the morphable inertial appendage, so that rotation movements can be made optimal. In some embodiments, the tail can be stowed away when not needed to provide a concise packaging and lower moments of inertia as needed.

In one aspect, a morphable inertial appendage allows for various advantageous properties, for example, any of: new or enhanced locomotion capabilities of the host by use of the morphable inertial appendage, in terms of attitude (orientation) and translation (including height); direct torque control capability of the host without considering the control of the appendage; high speed and accurate appendage and host manipulation; separable yaw and pitch control for the appendage without dynamic coupling considerations; and ease in adoption and tuning of the inertial appendage system. Control of the inertia adjustable appendage system can be informed by feedback from any of: motor/joint encoders, inertial measurement units, torsional sensors, optical sensors, or any combination thereof.

In another aspect, the invention pertains to methods of use and control of a morphable inertial appendage. Such methods can include the use of the morphable inertial appendage for locomotion provisions, enhancements or augmentations in various applications, including any of: ground electro-mechanical systems (e.g., hopping and turning of robots); air electro-mechanical systems (e.g., air manoeuvres of fixed wing aircrafts); marine electro-mechanical systems (e.g., high-speed turning and stoppage of boats); and space electro-mechanical systems (e.g., precise attitude control of satellites).

In another aspect, the inertial appendage system can be used as a haptic feedback device for various applications, including any of: vehicle (e.g., air/sea/land/space) command generation; computer command generation; and medical device command generation.

In some embodiments, the augmentable morphable appendage allows transfer of forces to the mechanical system (i.e., "host") to which it is attached without requiring high motor speeds to create these forces. For example, large torques can be supplied to the mechanical system to which the appendage is attached because the moments of inertia of the appendage are greatly amplified by the length the appendage extends from the host (e.g. tail length). In one aspect, the length of the appendage and the mass of the distal mass are determined to provide a desired inertial force, which may depend on the functional capabilities, size and mass of the host. In some embodiments, the distance the appendage extends is determined as a function of the distal mass and the desired inertial force. In some embodiments, the mass of the distal mass is determined as a function of the distance that the appendage extends and the desired inertial force. In some embodiments, the distal mass is 100 g or more (e.g., 150 g, 200 g, 300 g or more), while in other embodiments the distal mass is less than 100 g (75 g, 50 g, 25 g or less). In some embodiments, the appendage protrudes from the host a distance greater than 6 inches (e.g. 12 inches, 18 inches, 24 inches or more). In some embodiments, the appendage changes in length by 10% or more (e.g. 30%, 50%, 100%, 150%, 200% or more). In some embodiments, the appendage extends a variable distance depending on the inertial force desired. Since the appendage typically extends distally, it is referred to throughout the present application as a "tail", however, it is understood that the appendage is not limited to a distally extended orientation and could be deployed in various other orientations or directions as desired for a given applications. The term "morphable" can refer to any change of position, length, size, shape or any combination thereof sufficient to change an inertia of the appendage.

Systems having such morphable appendages can be utilized in various applications, including but not limited to: locomotion robots, aerospace, defense (e.g. gun turret target acquisition and tracking), tracking applications (e.g. fire hose aim control); surgical robotics and animatronics.

In another aspect, the invention pertains to a high performance spatial-parallel-linkage leg. As described herein "leg" refers to a set of linkages between an upper deck and a distal foot that supports the robot device, either fully or partly in combination with one or more other legs. In some embodiments, the high performance leg is a 1-DOF 3RRR (revolute-revolute-revolute) spatial-parallel-linkage leg ("R" referring to "rigid link"), in other embodiments the leg is a 3-DOF 3RSR (revolute-spherical-revolute) spatial-parallel-linkage leg. Such legs have ability to provide higher torque and motion bandwidth, larger range of motion and structural stability such as hopping, to further improve maneuverability, energy efficiency and stabilization. These improved legs can be used in combination with any of the features described herein, or can be utilized on existing robotic system so to improve operation, functionality, maneuverability and efficiency thereof.

In another aspect, the invention pertains to a high energy efficiency parallel-linkage leg. As described herein "leg" refers to a set of linkages between an upper deck and a distal foot that supports the robot device, either fully or partly in combination with one or more other legs. In some embodiments, the high energy efficiency leg is a 1-DOF 3RRR (revolute-revolute-revolute) parallel-linkage leg ("R" referring to "rigid link"), in other embodiments the leg is a 3DOF 3RSR (revolute-spherical-revolute) parallel-linkage leg. Such legs have higher resistance ability to decouple applied ground force and leg energy-stored spring force during movement, such as hopping, to further improve maneuverability, energy efficiency and stabilization. These improved legs can be used in combination with any of the features described herein, or can be utilized on existing robotic system so to improve operation, functionality, maneuverability and efficiency thereof.

Other features and advantages of the invention shall be apparent based upon the accompanying description, drawings, and claims.

BRIEF DESCRIPTION OF THE DRAWINGS

FIGS. 6A-6E depicts a scissor-style morphable inertial appendage, in accordance with some embodiments.

FIGS. 9A-9G depict a lead-screw style inertial appendages, in accordance with some embodiments.

FIGS. 10A-10C depict a planar linkage leg design.

DETAILED DESCRIPTION

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention.

Figure 1:
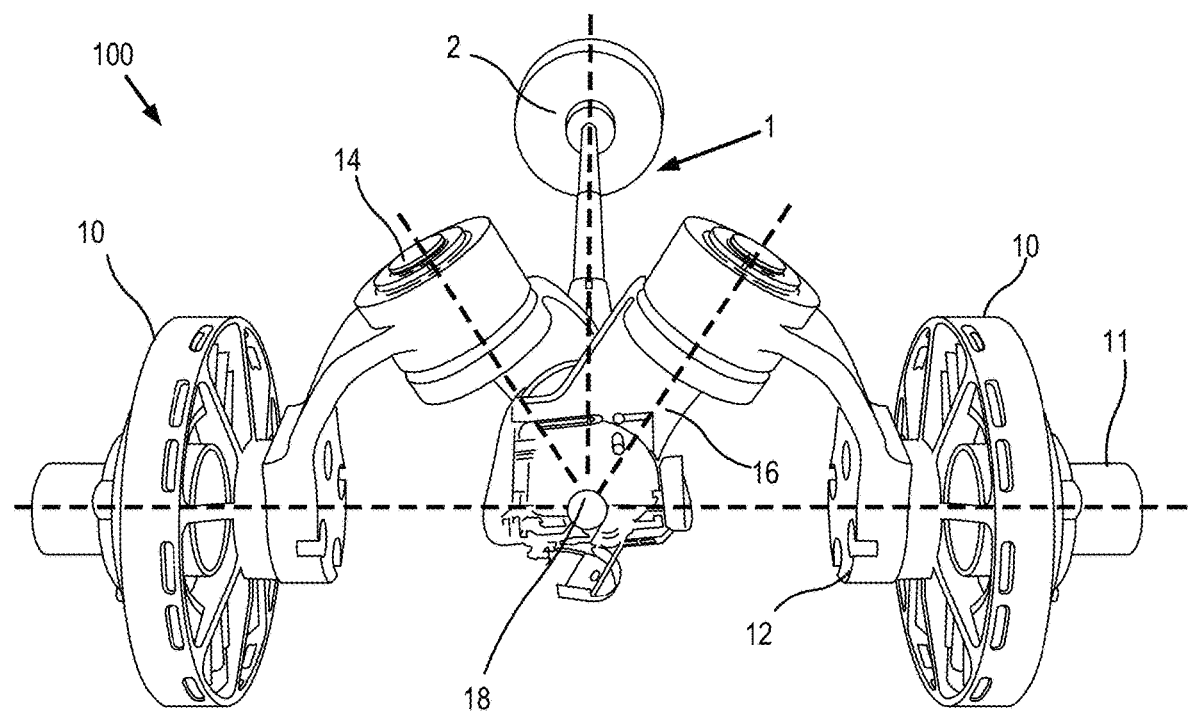
FIG. 1 depicts an exemplary system comprising a parallel spherical five-bar manipulator, in accordance with some embodiments of the invention.

FIG. 1 shows an exemplary embodiment of a mechanical system 100 utilizing a morphable inertial appendage 1. Specifically, the mechanical system is a parallel spherical five-bar manipulator. Such systems can be configured for a variety of applications, however, such systems have particular applicability to locomotion. In this embodiment, the parallel spherical five-bar manipulator 100 consists of two driving motors 10 in parallel, followed by a spherical five-bar linkage system in which a shoulder arm 12 is attached to each of the motors 10 directly, upon which a connector arm 16 is installed via a passive rotary joint 14. The morphable inertial appendage 1 (i.e. the fifth bar) is then attached to a connection of the two connector arms 16. Such a configuration allows the morphable inertial appendage 1 to pivot at remote center 18. In this embodiment, the morphable inertial appendage 1 is designed as a telescopic tail having a distal mass load 2. While a particular five-bar manipulator is depicted here, it is appreciated that the morphable inertial appendage 1 can be used with various other manipulators and mechanical system designs in which an inertial force can be utilized to assist in movement of the mechanical assembly.

Figure 2:
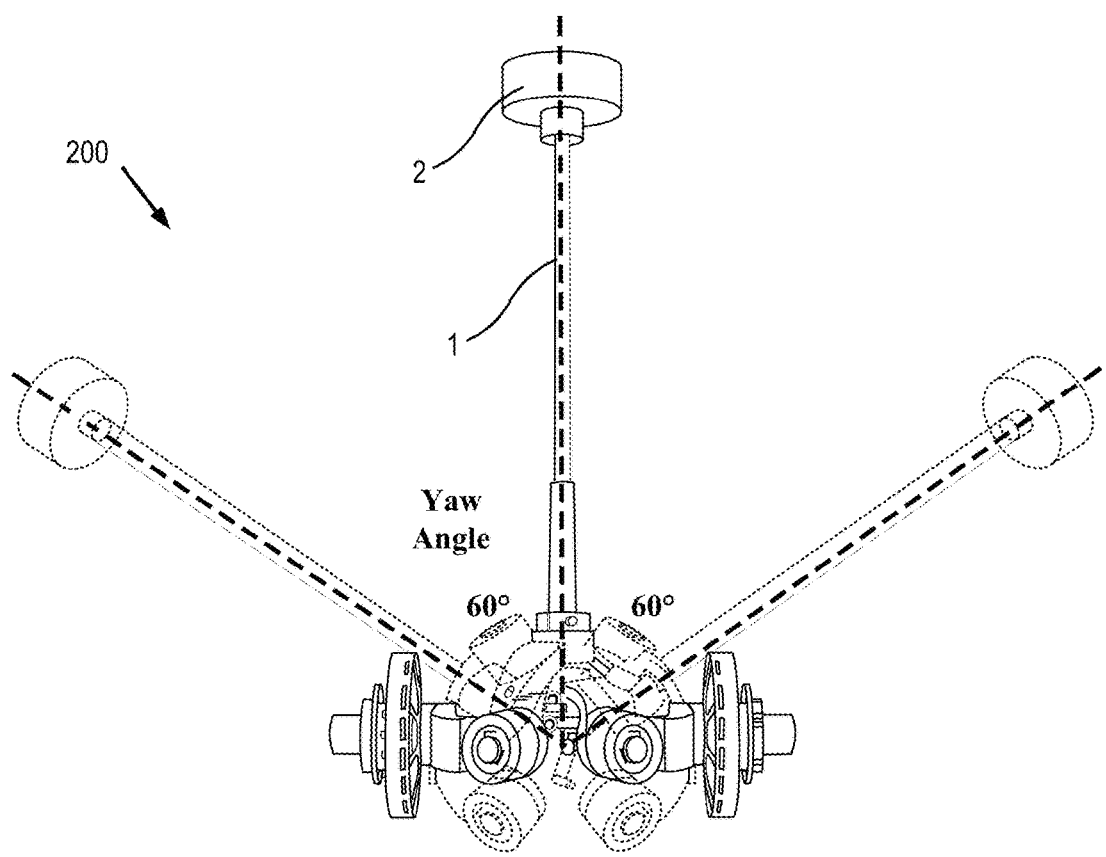
FIG. 2 depicts the range of motions of an inertial appendage assembly, in accordance with some embodiments.

Movement of the inertial appendage is achieved by rotations of motors 10 in combination. When the two motors 10 move in the same direction (e.g. common mode), the appendage exhibits a pitch motion. When the two motors 10 move in the opposite directions (e.g. differential mode), the appendage 1 exhibits a yaw motion, as shown in the schematic 200 of FIG. 2. These movements of the inertial appendage 1 supply the necessary rotation torques to the host, with magnitude coefficients being augmentable by the distance and weight of the end mass. The inertial appendage system can also be used to transfer energy to a mechanical system for translational movements. By telescoping the distal mass load 2 to varying distances from the supporting structure (e.g., tail length), the inertial forces produced by movement of the distal mass load can be increased or reduced to impart a desired magnitude of force to the supporting structure. It is appreciated that these differing types of movement can be provided in differing modes or can be utilized as needed within a common operating mode.

Figure 3:
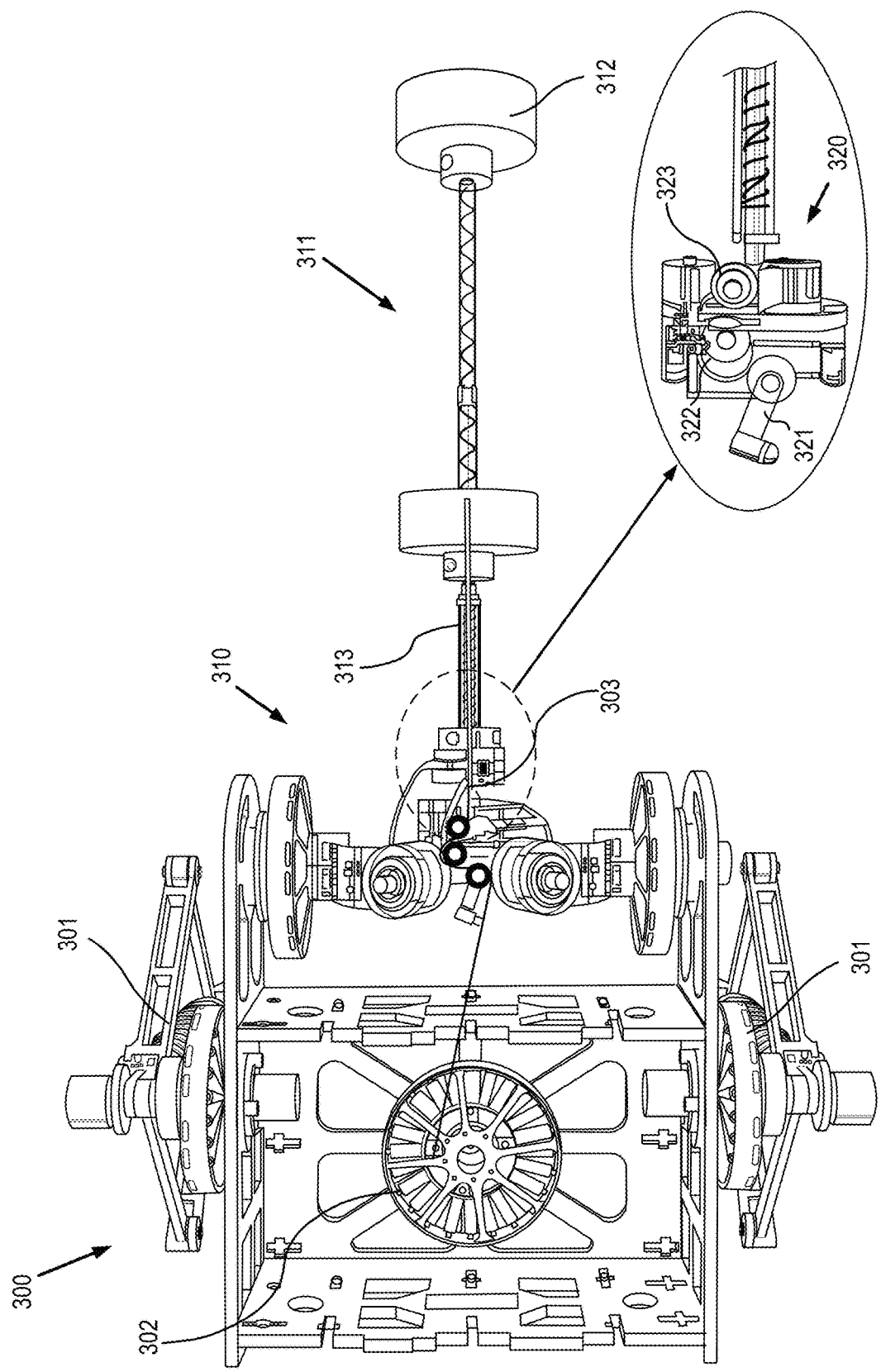
FIG. 3 depicts a visualization of a telescopic appendage installed on a hopping robot, in accordance with some embodiments.

In the case of a hopping robot 300, shown in FIG. 3, the inertial appendage assembly 310 includes an inertial appendage that telescopes between the extended and retracted configuration. In this embodiment, the inertial appendage assembly 310 attached thereto can pitch the telescoping inertial appendage 311 upwards such that the inertial forces from the distal mass 312 of the appendage compresses the robot's legs (obscured), storing mechanical potential energy, then pitch downwards such that the inertial forces from the distal mass 312 of the appendage further assist expansion of the robot's leg springs 301 and allow the robot 300 to take off. In this embodiment, the yaw and pitch movements of the inertial appendage 1 are controlled by the same approach as that described in FIG. 1. The telescoping movement of the inertial appendage 1 is facilitated by movement of a cable driven motor 302 disposed on the host, which is driven to wind or unwind cable 303 to adjust the length of the telescoping tail by compressing compression spring 313 to shorten the appendage or allowing compression spring 313 to expand to lengthen the appendage. This action can be further understood by referring to another view of a hopping robot shown in FIG. 4B in which the robot's legs 402 and leg springs 403 are clearly visible (although the appendage in this embodiment is folding rather than telescoping).

I. Morphable Inertial Appendage

Figure 4B:
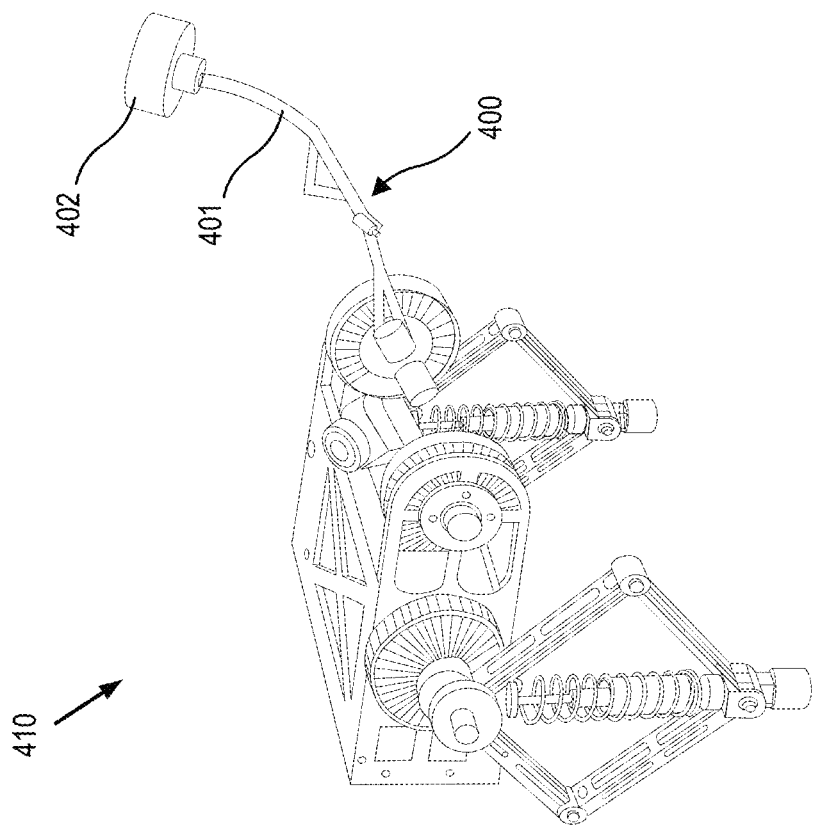
FIGS. 4A-4B depict a visualization of a folding inertial appendage and the appendage installed on a hopping robot, respectively, in accordance with some embodiments.
Figure 4A:
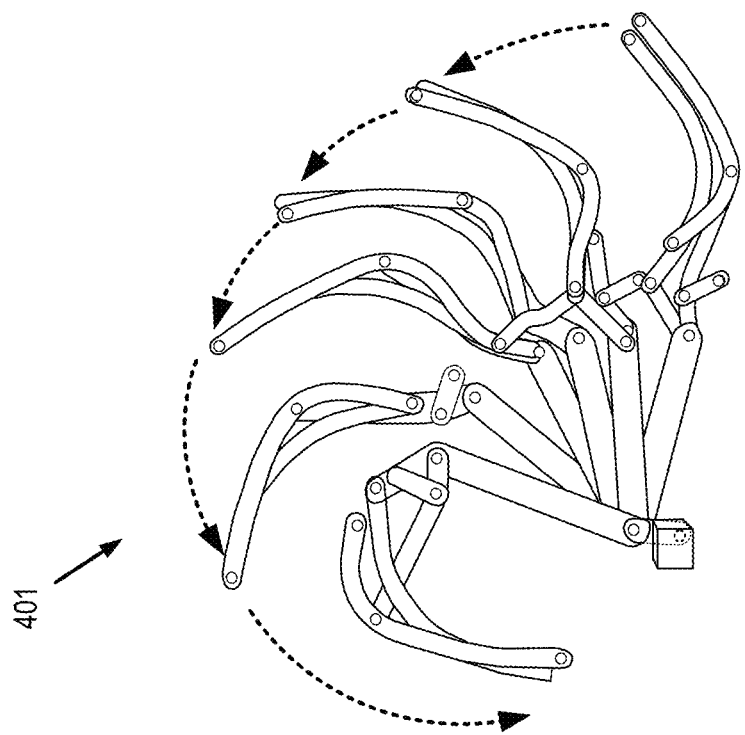
Figure 6E:
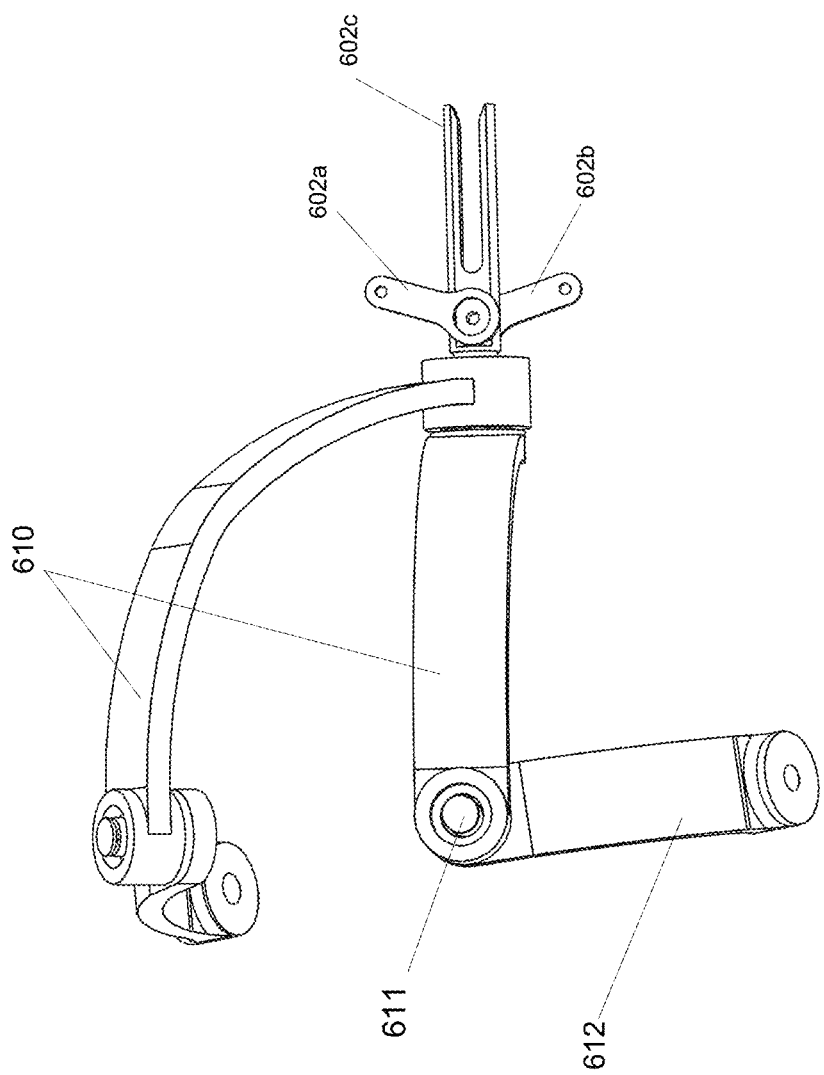
Figure 7:
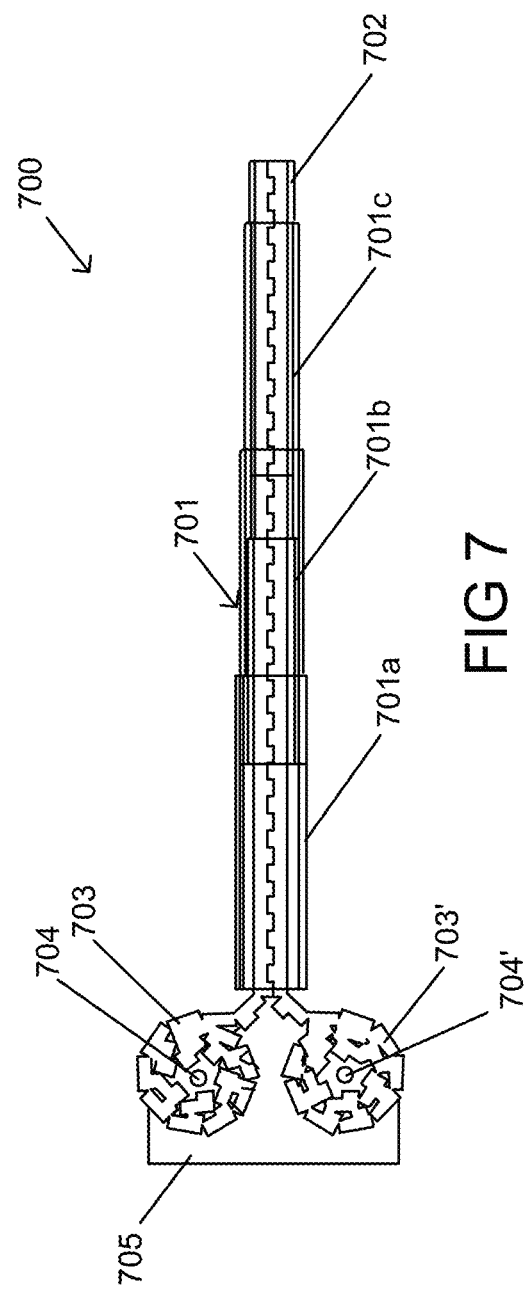
FIG. 7 depicts a chain matching mechanism of a morphable inertial appendage, in accordance with some embodiments.
Figure 8:
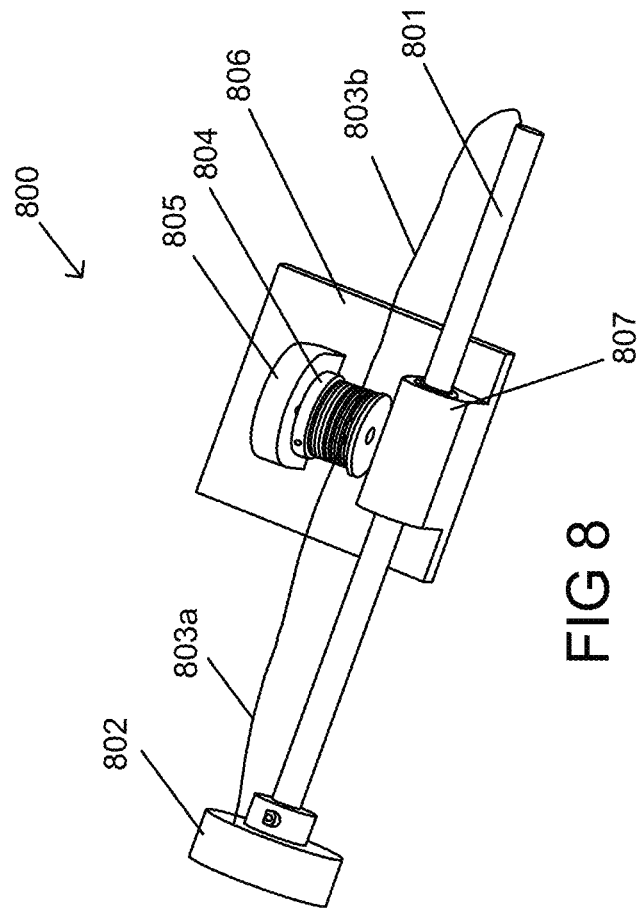
FIG. 8 depicts a cable-driven mechanism of a morphable inertial appendage, in accordance with some embodiments.

While the concept of a morphable inertial appendage can be realized by various approaches, the present application presents several exemplary approaches: a telescopic mechanism, for example as shown in FIG. 3, and a folding mechanism, for example as shown in FIGS. 4A-4B, a scissor like mechanism, for example as shown in FIGS. 6A-6D, a chain matching mechanism, for example as shown in FIG. 7, a cable back-and-forth mechanism, for example as shown in FIG. 8, and lead-screw mechanism, for example as shown in FIG. 9A-9G.

As described above, the telescopic appendage 311 enables augmentation of the appendage and host moments of inertia by means of extension and retraction of the end inertial mass along the appendage axis, such that the moments of inertia are increased at an extended state and decreased at a retracted state. The end mass 312 can also be moved to any intermediate position for a precise and optimal effect. In the embodiment shown, the stroke of the telescopic tail is about 170 mm, although it is appreciated it can be configured according to any stroke distance desired. While a particular design is shown in FIG. 3, it is appreciated that the telescopic appendage can be realized by any suitable mechanism, which may include any of: cables, pulleys, ball-screw sliders, lead-screw sliders, electromagnetic voice coils, or any combination thereof. For example, the embodiment shown in FIG. 3 utilizes a universal pulley system 320 (shown enlarged at lower right without cable 303), system 320 having a cable limiter 321, bearing 322, and pulley 323.

As shown in FIGS. 4A-4B, the morphable inertial appendage 400 folds between the extended and retracted configuration. In this embodiment, the morphable inertial appendage 400 can be designed with linkages that folds such that augmentation or morphing of the appendage and host moments of inertia is provided by means of folding and unfolding. In this embodiment, we used planar 8-bar-linkage design. Similar to the telescoping movement, this folding changes the distance of the distal mass of the appendage 400 from any supporting structure or host, thereby allowing for fine-tuned adjustment of the inertial forces imparted to the host. In some embodiments, the end mass can be folded inwards further than the distal mass of the telescopic appendage is capable of, however, its intermediate trajectory moves in an arc about the folding inertial appendage pivot joints, as shown in FIG. 4A. As shown in FIG. 4B, a hopping robot 410 can utilize a folding morphable inertial appendage assembly 400 having a movable appendage 401 with a distal mass 402 to facilitate hopping by utilizing inertial forces adjusted by folding appendage 401.

Figure 5A:
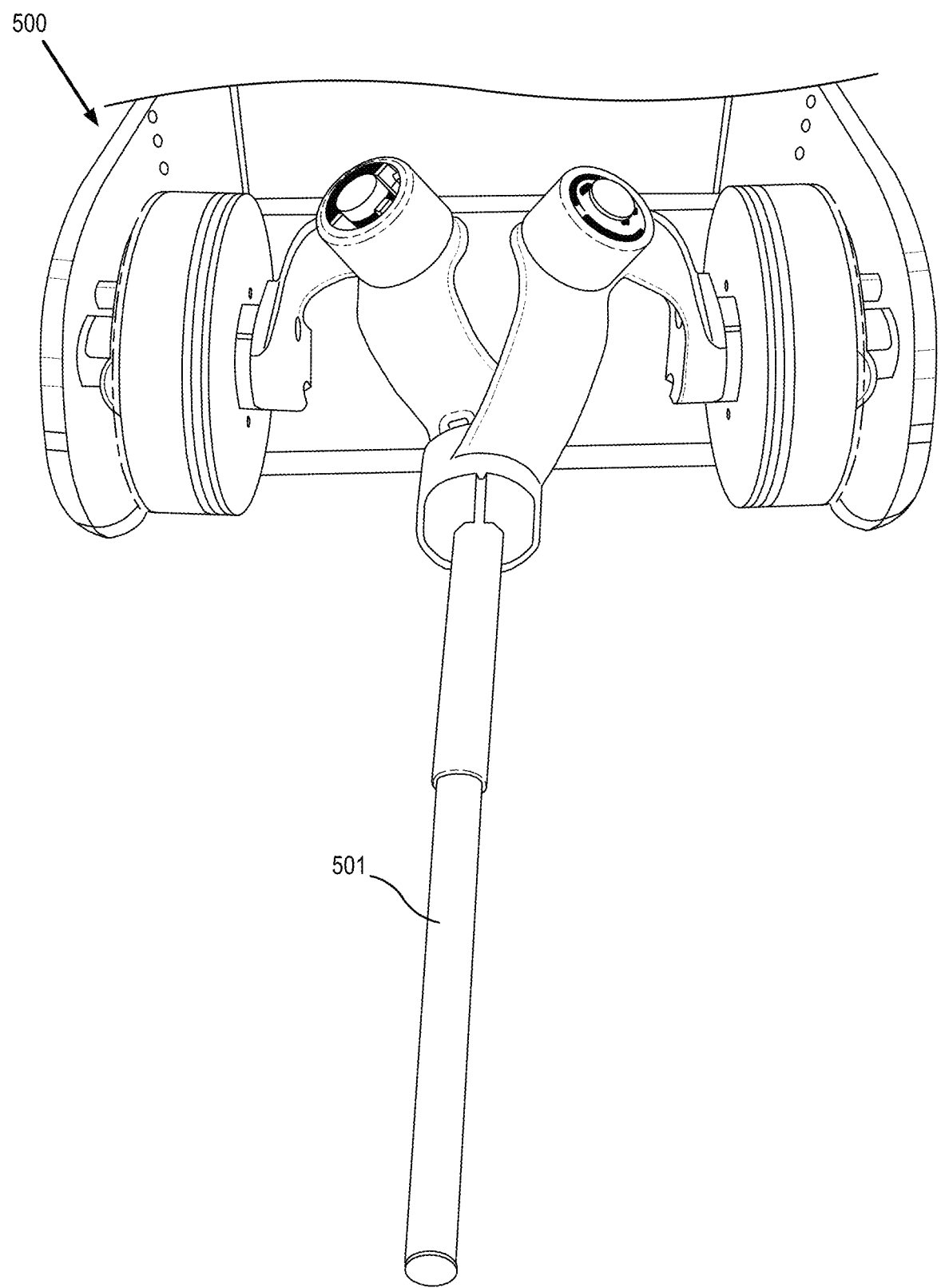
FIGS. 5A-5C depicts a prototype of an inertial appendage robotic system, in accordance with some embodiments.
Figure 5B:
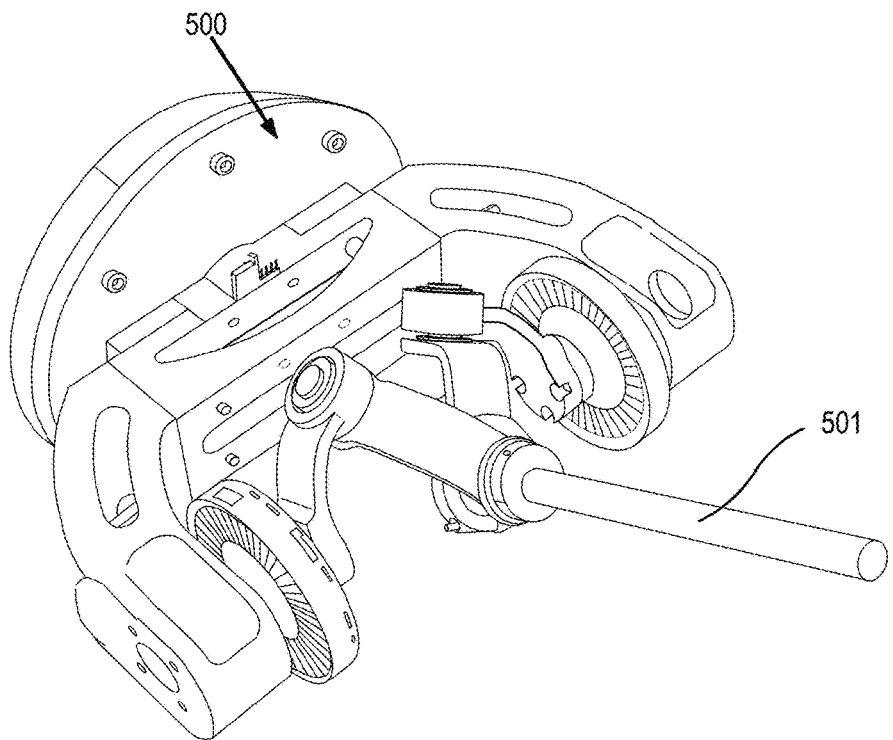
Figure 5C:
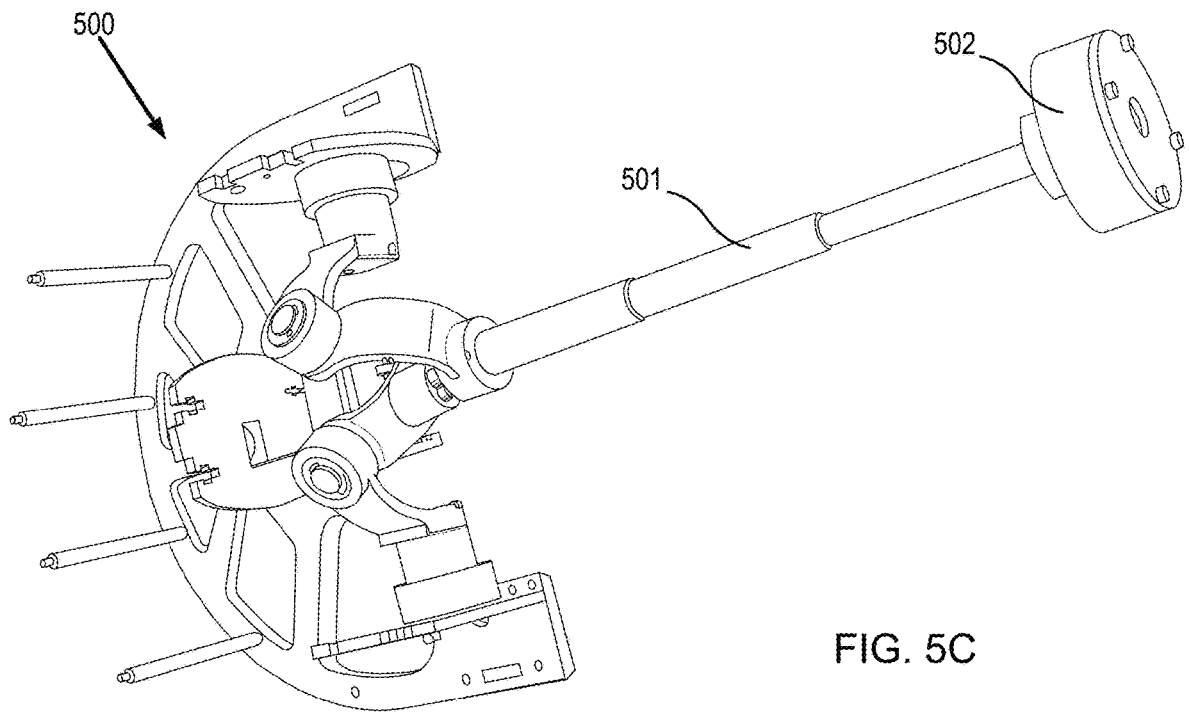

Current research and development has demonstrated a working parallel spherical five-bar manipulator system that utilizes an inertial appendage, for example manipulator system 500 utilizing a telescoping inertial appendage 501 as shown in FIGS. 5A-5C. Testing and simulations indicated that such a system can sustain repeated movements with a 200 g end load at a 30 cm extension distance from the host. The system operates utilizing control algorithms and software specifically developed to enable robust adaptive control of the inertial appendage. The functionality of the complete assembly for a variety of desired movements has been demonstrated in extensive simulations.

Figure 13C:
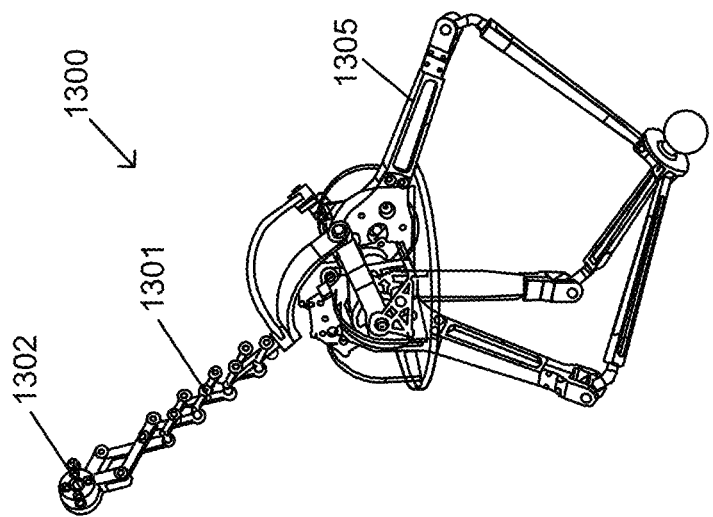
FIGS. 13A-13C depicts varying views of an agile dynamic robot having a scissor-like morphable inertial appendage and 3DOF 3RSR spatial parallel leg, in accordance with some embodiments.
Figure 13B:
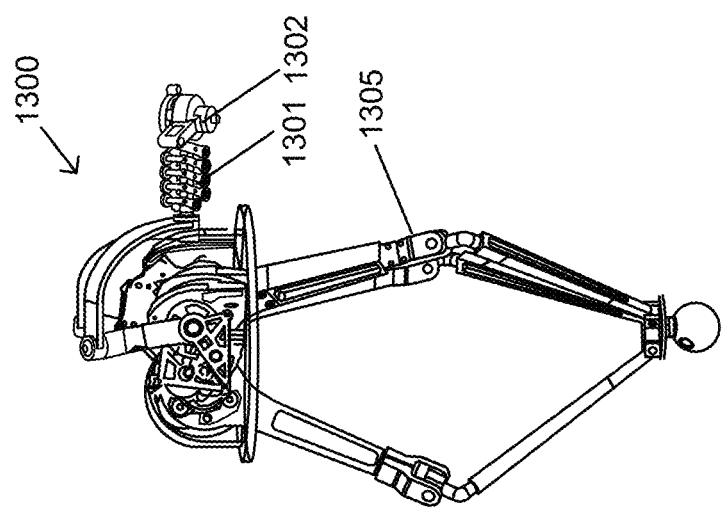
Figure 13A:
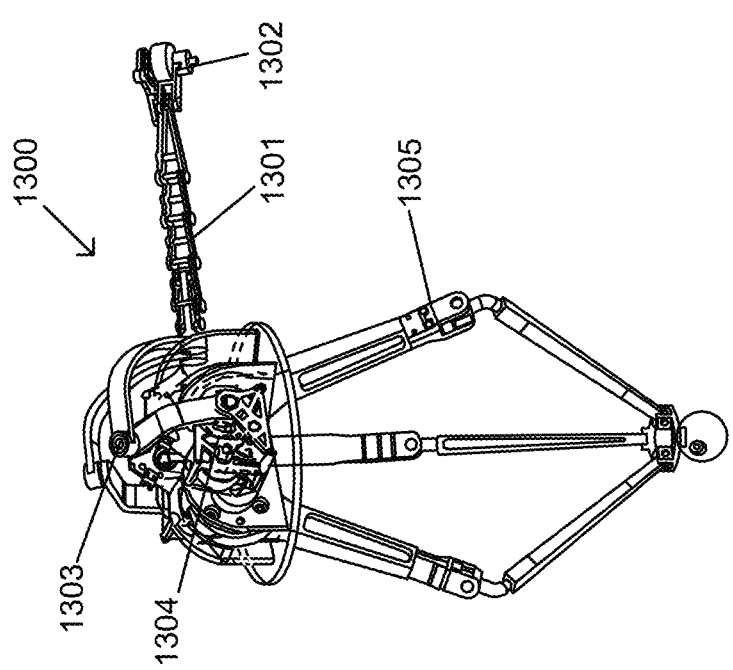

FIGS. 6A-6D show the concept of a scissor-style morphable inertial tail 600, with the incorporation of the proposed spherical five-bar manipulator 610. The tail includes a scissor-type expandable rig 601 that extends longitudinally upon actuation. FIG. 6A shows the expandable rig partly retracted, FIG. 6B shows the rig fully retracted, FIG. 6C shows the rig fully expanded and FIG. 6D shows the rig fully retracted and rotated by movement of manipulator 610 attached to the proximal end of the rig. FIG. 6E shows the base actuator 602 (shown without the remainder of the scissor-type expandable rig), in which movable arms 602a, 602b engage the first pair of parallel joints in the scissor-type rig so that as the subsequent joint slides along a center of the rig slides within slider 602c, the rig expands and contracts. Expandable rig 601 can operate in a conventional manner associated with scissor-type expandable rigs. In some embodiments, the power source cables of the motor wind along the scissor-type linkages, the motor directly drives (not spring driven) the distal end linkages and thus can control the scissor-type rig's length. In some embodiments, a parallel placed spring can help the rig maintain the expanded state. In addition, a slider extended from the SFB structure would provide the centers of the scissor-type tail a straight line along the tail's direction to slide in and strengthen the tail's stiffness. This also ensures the tail's stroke can be more than half of its longest length within only several loops of the four-bar linkages. The spherical five-bar manipulator 610 is in accordance with those described in previous embodiments, although it is appreciated that appendage 600 could be mounted on various other configurations of manipulators to provide same or similar functionality. In some embodiments, the motor is located at the distal end of the appendage such that the motor that is used to control the cables also serves as a distal load mass (see 1302 in FIG. 13A), although it is appreciated that the motor could be mounted elsewhere and that a distal mass similar to previous embodiments could be used.

FIG. 7 shows a telescoping inertial tail 700 actuated by a chain matching mechanism 702, 704. This approach is advantageous in a space limited applications. As shown, two chains 703, 703' wrap around pulleys or capstans 704, 704' which connects to one or more motors 705 (e.g. dual capstan motor or two motors). As the two chains are unwound, the chains engage each other and extend as rod 702 extending the telescoping tubes 701a, 701b, 703c outward. In the embodiment shown, a three-stage telescoping tube mechanism is applied with each of the three tubes being non-circular. Each tube has square sections both for inner and outer sections. The engaged chains forms a square-shape rod 702, passing through the inside of the entire telescoping mechanism and anchoring to the distal end of the top tube 701c. The engaged two-chain rod drives the movement of the top tube 701c, creating the movement of the entire telescoping tube, thereby lengthening the entire appendage. In this embodiment, each chain wraps or curls around a pulley or capstan that connects to an independent motor/ actuator or a single motor powering both capstans. It is appreciated that variations of the above embodiment can be realized.

FIG. 8 shows a movable inertial tail 800 actuated by a cable-driven back-and-forth mechanism. As cable 803a, 803b is attached to one or both ends of rod 801 such that winding the cables about a motor-driven rotor 804 that moves the appendage in one direction to an extended position and winding the cables in an opposite direction moves the appendage in the opposite direction to a retracted position. In the embodiment shown, the cable back-and-forth mechanism binds the cable on the rotor 804 of the motor 805, and the two ends of the cable are connected with the mass load 802 and the proximal end of the rod, respectively. The motor 805 is coupled to base plate 806 such that rotation controls the length of cable on both side of the rotor, determining the distance between the mass load and the fixed base portion 803, which is secured to the host. The rod is connected with the base through the use of a linear bearing 807. It is appreciated that variations of the above embodiment can be realized, such as one cable effecting movement in one direction and spring-loaded mechanism effecting movement in the opposite direction.

FIGS. 9A-9G show embodiments of an extendable inertial appendage actuated by a lead-screw mechanism. As shown, the lead-screw mechanism uses a lead screw to adjust extend the telescoping rod, thereby adjusting the MoI of the appendage.

FIG. 9A shows an extendable inertial appendage 900' with a single lead screw rod 901', which also acts as the rod and is actuated by a lead-screw servo motor. In this embodiment, motor 901' is located at the distal end and serves as both the actuator and mass load 901. It is appreciated that in other embodiments, the motor can be located elsewhere, such as at the proximal end. In this embodiment, the rotations of the motor cause the lead screw rod 901' to screw toward the base 910' of the appendage, shortening the entire appendage length. In this embodiment, the base portion needs sufficient space for the lead screw when the lead screw is screwed in when in the retracted configuration.

FIG. 9B shows another embodiment of a lead-screw appendage 900 that uses three-stage telescoping tubes (top tube 901c, middle tube 901b, and bottom tube 901a). A motor rotates a small diameter lead screw rod 903 that is concentrically mounted with the bottom tube 901a, where the outer-side lead screw of the rod engages with the inner-side lead screw of the inner tube, as shown in FIG. 9C. The outer-side lead screw of the inner tube then engages with the inner-side lead screw 903' (see inner threads) at the bottom part of the top tube 901c, as shown in FIG. 9D. The inner section of the middle tube 901b is a hexagonal shape 904b, as can be seen in FIG. 9E, and is matched with the outer-side hexagonal shape 904c at the bottom part of the top tube 901c, as can be seen in FIG. 9D, to maintain linear relation and prevent relative rotation between the telescoping sections. A small variation from the hexagonal shape to the round shape at the top part of the inner-side of the middle tube avoids the separation between the top tube and the middle tube. Similarly, the inner section of the bottom tube 901a is a round shape 905a, as shown in FIG. 9F, and is matched with the outer-side round shape 905c at the bottom part of the middle tube, as shown in FIG. 9G, to maintain linear movement. A small variation from the round shape to the hexagon shape at the top part of the inner-side of the bottom tube avoids the separation between the middle tube and the bottom tube and prevents their relative rotation. At last, the bottom tube 901a is fixed on the connector with stator of a motor. The inner lead screw rod 903 is controlled by the motor, and then transmitting the rotation to the inner tube, thus creating the linear motion of the top tube. In some embodiments, the mass load at the top of the top tube forces the entire tail to retract and the separation preventing mechanism on the tube can ensure the tail is able to extend.

It is appreciated that the above example of a morphable inertial appendage are exemplary and variations and modifications of the embodiments described above are in accordance with the concepts described herein. For example, many such embodiments can further utilize an additional spring-type mechanism to bias the appendage toward a particular configuration (e.g. extended, retracted or partly extended) to further increase speed and efficiency in moving or altering the shape of the appendage.

II. Spatial Parallel Linkage Leg

In another aspect, the invention pertains to an improved support leg that improves agility and maneuverability of robotic systems, particularly tail-inspired agile dynamic robots. This improved support leg can be realized as a 1-DOF 3-RRR-Spatial-Parallel-linkage Leg or a 3-DOF 3-RSR-Spatial-Parallel-linkage Leg. In the example below, the leg is controlled indirectly, for example by the swinging appendage (e.g. tail) through the reaction torque. Typically, in many dynamic robotic applications, a one-DoF energy-stored compliant springy leg is required. FIGS. 10A-10C shows conventional planar leg designs that include a central axial spring-type member 1003 and one or more two-member serial linkages 1101. By contrast, in some embodiments, the improved support leg has higher resistance ability to decouple the applied ground friction force and leg energy-stored spring force during hopping and has a very high energy transfer efficiency during the body energy to the spring energy and the spring energy to the body energy in robot locomotion.

Figure 11:
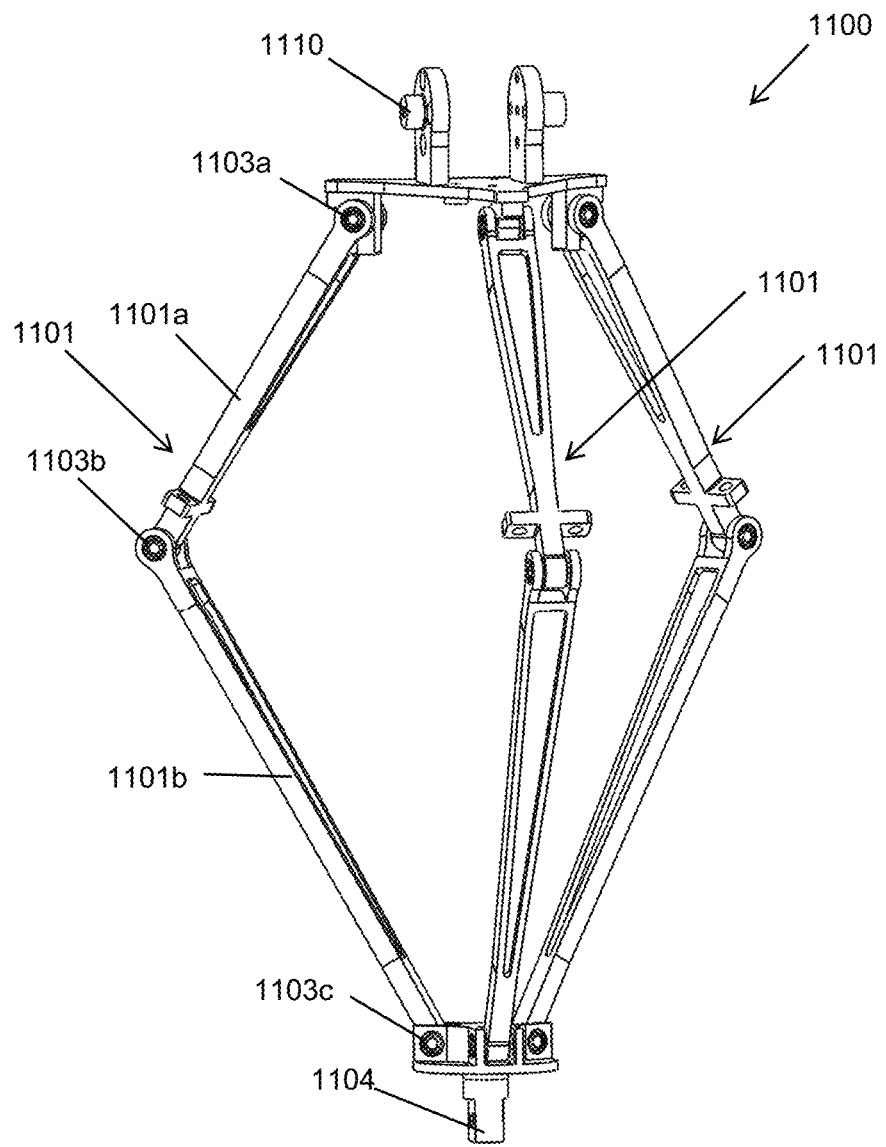
FIG. 11 depicts a 3RRR spatial parallel leg design, in accordance with some embodiments.
Figure 16:
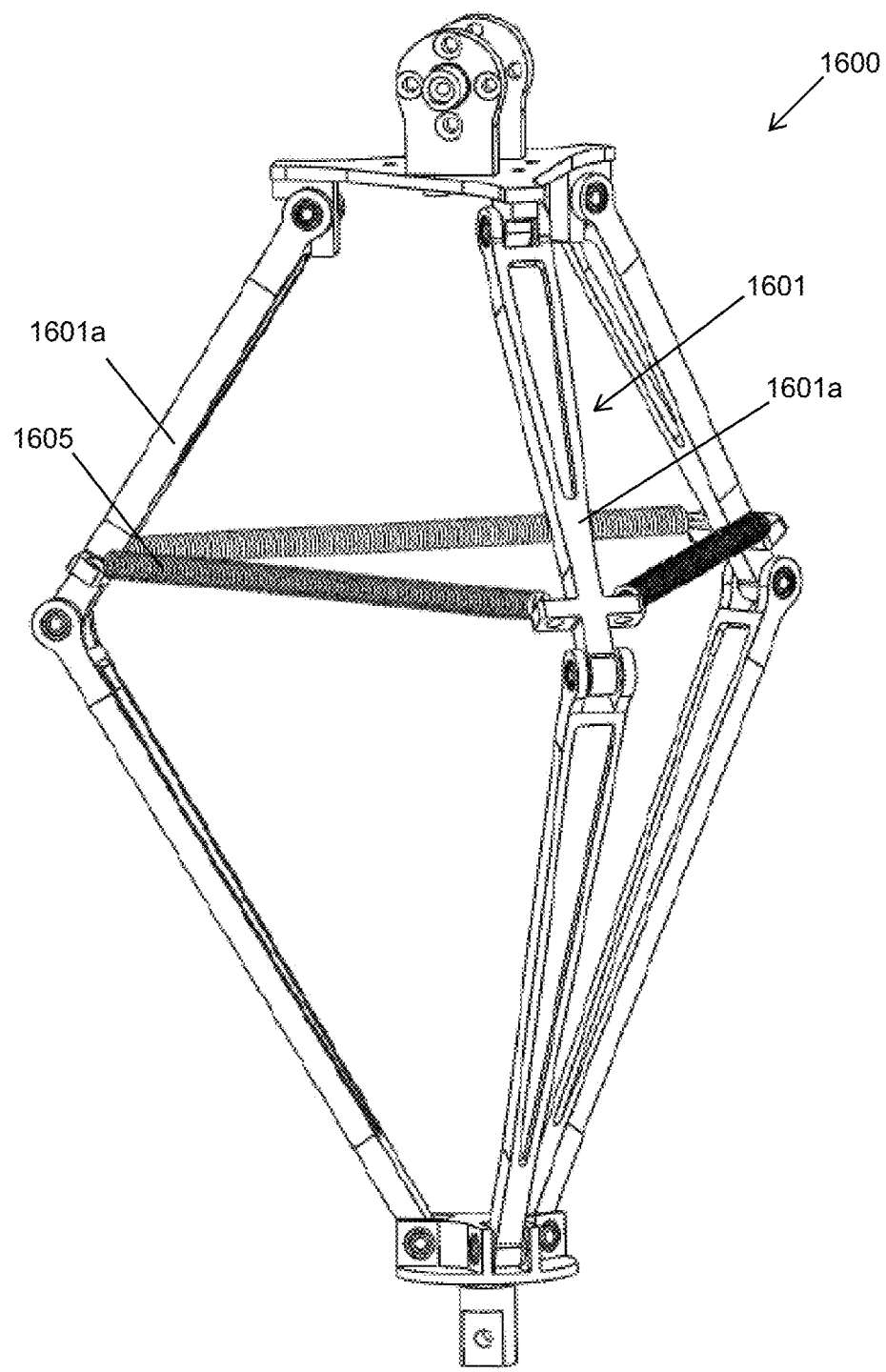
FIG. 16 depicts a 3RRR spatial parallel leg spring design, in accordance with some embodiments.

FIG. 11 shows an exemplary 3-RRR-Spatial-Parallel-Linkage leg 1100. This leg design is particularly advantageous when used with a dynamic robot having a morphable appendage, for example, a dynamic hopping robotic system. In one aspect, each of three supports 1101 includes serial linkage chain including two bars 1101a, 1101b connected by one revolute joint 1101b. At the connection point with upside and downside platform, another two revolute joints 1103a, 1103, respectively, are used to connect the chain. In this embodiment, the three revolute joints of the chain rotate in the same direction. The three chains are averagely distributed around the space, and the angles between each two of them is between 90 and 145, typically each being 120 degrees. These parallel mechanisms creates the linear motion between the upside and downside platform and results in the Center-of-Mass of the leg locates exactly on the center axis line. As can be seen, this design avoids the need for a one DOF spring actuated support in the center, which provides for markedly improved stroke length, stability of the structure and offset axis disturbance rejection, among other advantages. This design, when combined with use of a robot system having a morphable appendage allows the robot to achieve spectacular maneuverability, energy efficient locomotion, and robust stabilization to large perturbations, which may not be easily attained in the existing legged robots. Such a combination of features allows for robotic system that perform extreme locomotion maneuvers with ease by use of the morphable inertial appendage. FIG. 16 shows another exemplary 3-RRR-Spatial-Parallel-Linkage leg 1600 that is substantially the same or similar to the configuration in FIG. 11 except the three upper bars 1601 of the three supports 1601 are connected with three tension springs 1605 to provide energy-storage capability.

By combining a morphable appendage (e.g. swinging tail) with an improved springy support leg design, such as that of FIG. 16, the role of the morphable appendage in robot locomotion can be further expanded upon. A controller can control locomotion of the robot utilizing the morphable appendage without the movement limitations associated with the conventional axial leg support design, which allows for control strategies to realize extreme maneuvers such as energizing and maintaining a stable hopping motion, quick tail-inspired turn or forward somersault to demonstrate the advantages of having an external appendage in locomotion.

By combining a morphable inertial tail with a 3-DOF 3-RSR-Spatial-Parallel-Leg design, such as in agile dynamic robot 1200 in FIG. 12, the robot can perform more extreme maneuvers such as directional hopping, continuous somersaults in the air that are even maneuverability of conventional dynamic robots (or even human or animal capabilities). Thus, the 6-DOF robot provides a new platform to explore and expand upon robot agile locomotion. The 3-DOF 3-RSR-Spatial-Parallel-Leg design is particular advantageous in extreme 3D motion because it can offer higher motion and torque bandwidth, larger range of motion in pitch/yaw directions, larger stroke along the compression/extension axis as compared to conventional 3d hopping machine designs [for example, see M. H. Raibert, H. B. Brown, and M. Chepponis, "Experiments in balance with a 3D one-legged hopping machine," The International Journal of Robotics Research, vol. 3, no. 2, pp. 75-92, 1984.] [Z. Batts, J. Kim, and K. Yamane, "Design of a hopping mechanism using a voice coil actuator: Linear elastic actuator in parallel (leap)," in Robotics and Automation (ICRA), 2016 IEEE International Conference on, May 2016.]. In typical 3D hopping leg designs, the proximal-end actuators need to undertake the weight of the distal-end actuators, significantly limiting the overall leg output force and motion bandwidth. The 3-DOF 3-RSR-Spatial-Parallel-Leg design can provide large stiffness and faster response at the distal end because through rigid mechanical linkages, three actuators can work simultaneously to support 1-DOF movement without undertaking another actuator's weight, while all three actuators can locate closely to the center of mass of the robot.

III. Agile Dynamic Robots

To fully utilize the advantage of the morphable inertial tail, a specialized tail-inspired dynamic robot has been developed. The tail-inspired agile dynamic robot consists of morphable inertial tail, host body and one or more support legs, for example, a single support leg. The leg can be a 1-DOF 3-RRR parallel leg or a 3-DOF 3-RSR spatial leg. In some embodiments, the proposed tail is particularly advantageous for a dynamic single leg hopping, for example as can be seen in FIGS. 12A-13C.

Figure 12B:
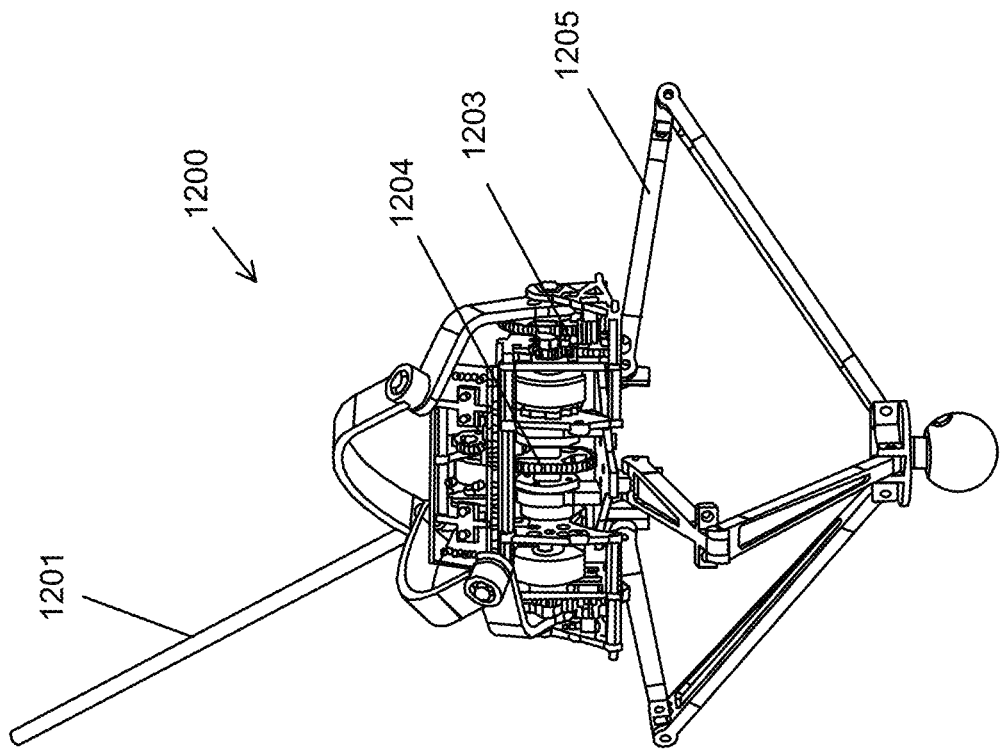
FIGS. 12A-12B depicts a chain matching mechanism of a morphable inertial appendage and 1DOF 3RRR spatial parallel leg, in accordance with some embodiments.
Figure 12A:
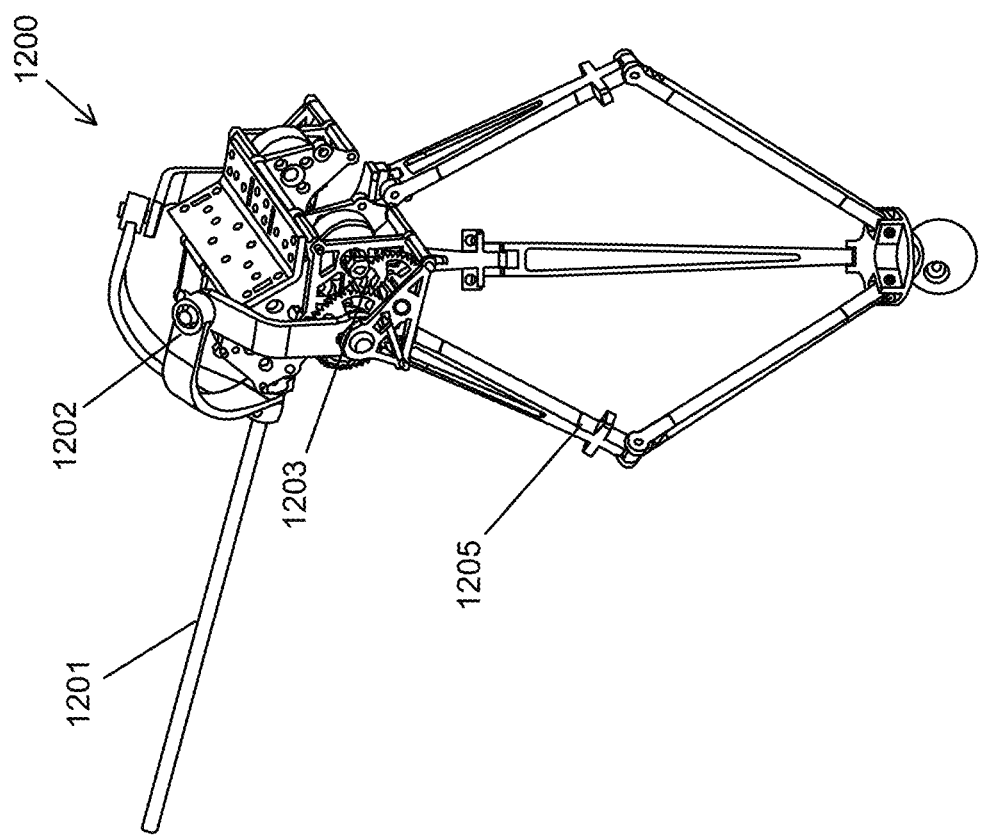

FIGS. 12A-12C show an agile dynamic robot 1200 comprising a movable appendage 1201 supported by a manipulator system 1202 that can change the orientation and/or attitude of the movable appendage 1201 thereby effect changes in inertia to facilitate dynamic movements, as described previously. The manipulator system 1202 is attached by additional gears 1203 that can further change the position of the appendage (e.g. pitch), which are powered by internal actuators 1204 (e.g. motors, servos, etc). The robot is support by a 1-DOF 3-RRR spatial parallel leg 1205, such as that described in FIG. 11.

FIGS. 12A-12C show an agile dynamic robot 1300 comprising a morphable appendage 1301 comprising a scissor-type expandable rig that is supported by a manipulator system 1303 that can change the orientation and/or attitude of the movable appendage 1301 that effect changes in inertia to facilitate dynamic movements. The manipulator system 1303 is attached by additional gears 1304 that can further change the position of the appendage (e.g. pitch), which are powered by internal actuators (e.g. motors, servos, etc). The robot 1300 is support by a 3-DoF 3-RSR-Spatial-Parallel-Leg 1305, as can be seen the intermediate joint is spherical thereby providing further degrees of freedom within the support leg.

In some embodiments, when incorporating the robot with the 1-DOF compliant leg, one motor mounted on the body is used to control the leg landing angle. When using the 3-DOF 3-RSR spatial parallel leg, three motors on the body together control the leg simultaneously. Electrical board, motors, sensors utilized for such control can be disposed within the host body. The 3-RSR-Spatial-Parallel-Leg allows for achieve a large range of multi-directional movement control to be achieved while the movable appendage assists in balancing the host as well as a source of dynamic power to energize dynamic movements.

One particular application for the tail-inspired agile dynamic robot is to achieve a somersault, while maintaining balance and control of trajectory. The retraction of the morphable inertial appendage speeds up the rotation significantly, facilitating an early completion of the forward somersault even at low forward speed. This feature prevents the ground contact with the long tail or the host body.

Figure 14:
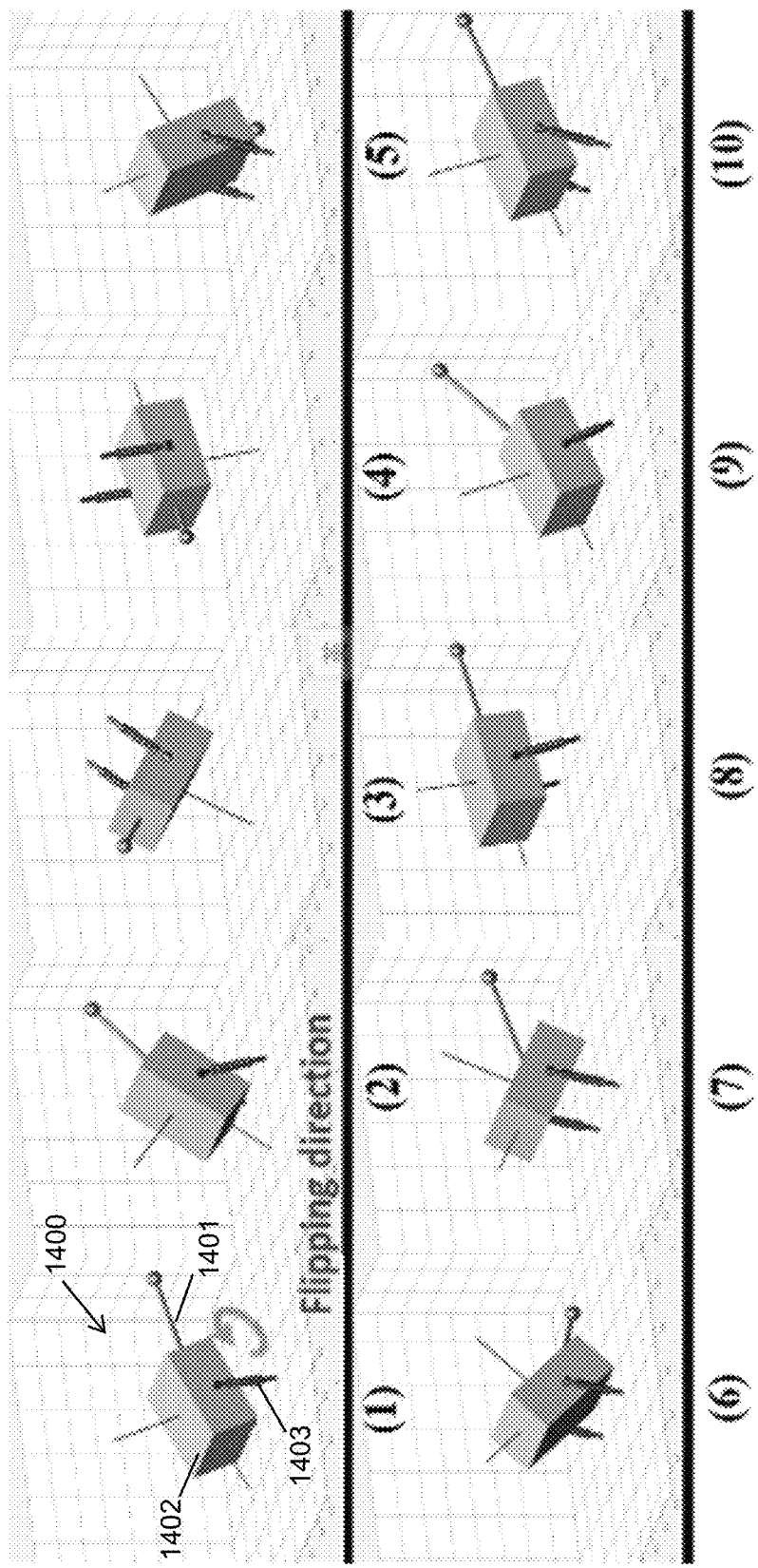
FIG. 14 depicts varying sequential views of an agile dynamic robot having a morphable inertial appendage performing a forward somersault with a tail retraction and extension, in accordance with some embodiments.
Figure 15:
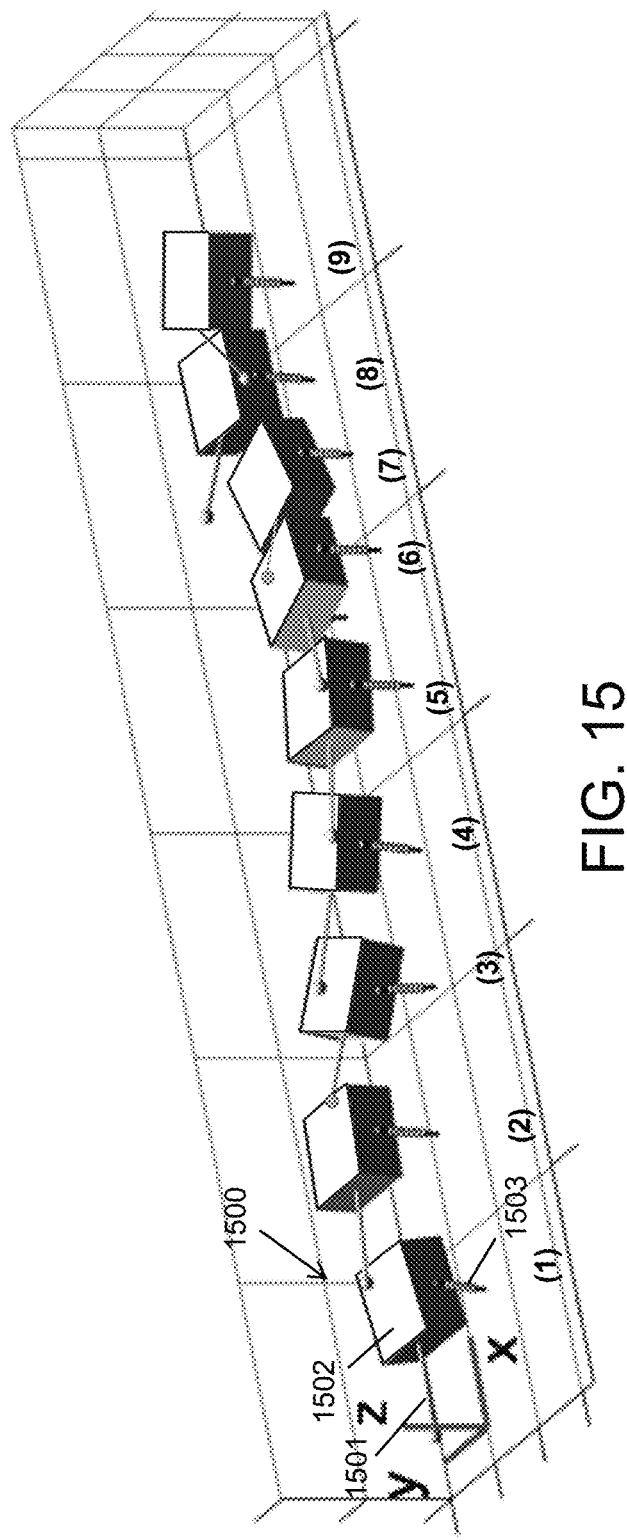
FIG. 15 depicts varying sequential views of an agile dynamic robot having a morphable inertial appendage performing a continuous turn and hop, in accordance with some embodiments.

FIG. 14 shows sequential views of a somersault movement described above of an agile dynamic robot 1400 utilizing a movable appendage 1401 attached to a host 1402 that is supported by springy 1 DOF legs 1402. FIG. 15 shows sequential views of a continuous hop and turn movement by an agile dynamic robot 1500 utilizing a movable appendage 1501 attached to a host 1502 that is supported by springy 1 DOF legs 1502. It is appreciated that such movement can further be realized by agile dynamic robots having a single springy support leg, such as that described in FIG. 16, or a 3-RSR spatial parallel leg as described above.

II. Control Software Package

In another aspect, the invention pertains to control software configured to control the morphable inertial appendage so that movement and morphing of the morphable appendage is coordinated to facilitate a desired movement and/or inhibit an undesired movement of the mechanical assembly or host. Such control software can be embodied in programmable instructions recorded on a non-transitory medium, typically one or more processors of a control unit operably coupled with the appendage. Typically, the control software receives inputs corresponding to a state and/or a movement of one or more components or linkages of the mechanical system to which the appendage is attached such that the augmentation/morphing of the appendage and/or movement of the appendage is coordinated with a desired or commanded movement of the mechanical system. The control unit of the appendage may be separate from the mechanical system or integrated within an overall control unit of the mechanical system or host.

In some embodiments, control and estimation software for the morphable inertial appendage system is provided such that precise and accurate torques can be supplied to the host. The controller software is adaptive and robust such that its operation is safe and optimized at different tail postures, different inertial tail extension levels, and host operational states. Undesired gravitational and dynamic effects of the appendage system can therefore be cancelled by the software. This robust and adaptive behavior is particularly advantageous, as the parasitic effects would normally adversely affect system performance. Retuning of the controller is also unnecessary due to the robust and adaptive nature of the control software.

Methods of controlling such an augmentable or morphable appendage are also provided. Such control methods can include: receiving an input corresponding to a desired state or movement of all or at least a portion of a mechanical system or host, the system having a morphable appendage attached thereto; determining a modified state of the morphable appendage that facilitates the desired state or movement; and augmenting or morphing the appendage to the modified state such that inertial forces from the modified appendage facilitate the desired state or movement of the mechanical system. In some embodiments, the method can further include determining a movement of the morphable appendage. The movement of the appendage may also be associated with a current movement or anticipated movement of the host to which it is attached. In some embodiments, the method can include determining multiple modified states of the appendage or a dynamic changing state of the appendage during a complex movements or series of desired movements of the host. Such methods can further include coordinating augmenting or morphing of the appendage during movement of the appendage and/or movement of the attached mechanical system or host.

III. Practical Applications

The morphable inertial appendage described herein can be utilized to improve and control movement of various types of mechanical systems, including but not limited to robotics, aircrafts, defense and satellites.

In some embodiments, the systems utilize the concepts described herein to provide agile locomotion of ground robots, including energy pumping, dynamic manoeuvres, and attitude stabilization of a hopping robot. In some embodiments, such systems are used to provide agile aerobatic manoeuvres of aircrafts in the absence of aerodynamic forces. In other embodiments, these systems can be used to provide rapid and precise attitude control of satellites. In other embodiments, these systems can be used in defense applications, for example, providing smoother and faster target tracking for gun turrets. In still other embodiments, the system provides instrument manipulation in manufacturing and surgical robots, for example, enabling smoother rotation and displacement control of the end surgical instrument. In other embodiments, these systems can be used for actuation in animatronics.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A morphable inertial appendage system attachable to a host robotic locomotion system configured for movement from one place to another, the system comprising:
a morphable appendage supported at a proximal end and extending to a distal end, wherein the appendage is morphable between an extended configuration and a retracted configuration; and
an actuator system operably coupled to the appendage and configured to control movement of the appendage along one or more degrees of freedom so as to impart inertial forces on the robotic locomotion system when attached to the morphable appendage thereby improving movement of the robotic location system as compared to operation of the locomotion system without the imparted inertial forces.

2. The system of claim 1, wherein the morphable appendage comprises a distal mass that is disposed at or near the distal end and being of sufficient mass to impart a desired inertial force on the robotic locomotion system upon movement of the appendage.

3. The system of claim 1, further comprising:
a morphing actuator system that effects morphing of the appendage between the extended and retracted configurations.

4. The system of claim 3, wherein the morphing actuator system comprises one or more of: an electric motor, electric servo, fuel engine, a piston, a pulley, or any combination thereof.

5. The system of claim 3, wherein the morphing actuator system is disposed on the morphable appendage.

6. The system of claim 3, wherein the morphing actuator system is disposed on the robotic locomotion system to which the morphable appendage system is attached.

7. The system of claim 3, wherein the morphing actuator system comprises a scissor-type expandable rig.

8. The system of claim 3, wherein the morphing actuator system comprises a cable-driven mechanism having a motor-driven cable attached to one or both ends of the appendage.

9. The system of claim 3, further comprising:
a control unit operably coupled to each of the morphing actuator system and the actuator system controlling movement of the appendage, wherein the control unit is configured to coordinate movement of the appendage and morphing movement of the appendage so as to impart a desired inertial force on the robotic locomotion system to which the morphable appendage system is attached, such that the inertial forces imparted by the morphable inertial appendage system during operation of the locomotion system provide increased attitude and/or translation maneuver capabilities as compared to operation of the locomotion system without the imparted inertial forces.

10. A robotic locomotion system, the robotic locomotion system comprising:
a host mechanical system configured for movement from one place to another;
a morphable inertial appendage system attached to the host mechanical system, the system comprising:
a morphable appendage supported at a proximal end and extending to a distal end, wherein the appendage is morphable between an extended configuration and a retracted configuration;
an actuator system operably coupled to the appendage and configured to control movement of the appendage along one or more degrees of freedom so as to impart inertial forces on the robotic locomotion system when attached to the morphable appendage thereby improving movement of the robotic location system as compared to operation of the locomotion system without the imparted inertial forces; and
a morphing actuator system that effects morphing of the appendage between the extended and retracted configurations, wherein the morphing actuator system comprises one or more of: an electric motor, electric servo, fuel engine, a piston, a pulley, or any combination thereof;
a control unit operably coupled to each of the morphing actuator system and the actuator system controlling movement of the appendage, wherein the control unit is configured to coordinate movement of the appendage and morphing movement of the appendage so as to impart a desired inertial force on the locomotion system,
wherein the locomotion system is configured such that the inertial forces imparted by the morphable inertial appendage system during operation of the locomotion system provide increased attitude and/or translation maneuver capabilities as compared to operation of the locomotion system without the imparted inertial forces.

11. The robotic locomotion system of claim 10, wherein the locomotion system is configured with direct torque control independently from control of the appendage.

12. The robotic locomotion system of claim 10, wherein the locomotion system is configured such that torque commands are responded to on a host level without consideration of movement of the inertial appendage.

13. The robotic locomotion system 10, wherein the morphable appendage system is configured to morph the appendage between the extended and retracted position within 0.5 seconds or less.

14. The robotic locomotion system 13, wherein the morphable appendage system is configured to morph the appendage between the extended and retracted position within one hundred milliseconds or less.

15. The robotic locomotion system of claim 10 wherein the robotic locomotion system is supporting by a springy leg having a plurality of support arms, each support arm coupled between an upper deck attached to the host and a lower deck attached to a foot.

16. The robotic locomotion system of claim 15, wherein each support arm comprises a plurality of rotatable joints that rotate along the same direction such that a center of mass lies along a center axis of the support leg.

17. A method of controlling and/or stabilizing movement of a robotic locomotion system having a morphable inertial appendage attached thereto, the method comprising:
actuating morphing movement of a morphable appendage between an extended configuration and retracted configuration, wherein the morphable appendage extends distally from the robotic locomotion system to a distal portion of the morphable appendage that carries a distal mass;
actuating movement of the morphable appendage along one or more degrees of freedom; and
coordinating the morphing movement and/or the movement of the morphable appendage along the one or more degrees of freedom thereby imparting one or more desired inertial forces to the robotic locomotion system, thereby facilitating a desired movement and/or stabilizing movement of the host as compared to operation of the locomotion system without the imparted inertial forces.

* * * * *